United States Patent [19]

Passauer et al.

[11] 3,947,300

[45] Mar. 30, 1976

[54] FUEL FOR GENERATION OF NONTOXIC PROPELLANT GASES

[75] Inventors: Hermann Passauer; Roland Hubel, both of Waldkraiburg, Germany

[73] Assignee: Bayern-Chemie, Aschau, Germany

[22] Filed: July 9, 1973

[21] Appl. No.: 377,325

[30] Foreign Application Priority Data

July 24, 1972 Germany............................ 2236175

[52] U.S. Cl. ...................... 149/35; 149/61; 149/77
[51] Int. Cl.² ......................................... C06B 35/00
[58] Field of Search.......................... 149/35, 61, 77

[56] References Cited
UNITED STATES PATENTS 2,981,616  4/1961  Boyer................................. 149/35
3,785,674  1/1974  Poole et al........................ 149/35 X
3,797,854  3/1974  Poole et al........................ 149/35 X

*Primary Examiner*—Stephen J. Lechert, Jr.
*Attorney, Agent, or Firm*—Hammond & Littell

[57] ABSTRACT

A propellant composition for the generation of nontoxic propellant gases suitable for the inflation of air cushion protective devices for passengers in motor vehicles comprises mixtures of (a) at least one stable metal azide, (b) at least one oxidant metal compound, and (c) silicon dioxide.

6 Claims, No Drawings

FUEL FOR GENERATION OF NONTOXIC PROPELLANT GASES

THE PRIOR ART

The problem of providing nontoxic propellant gases for inflatable protective cushions and the like has received a good deal of attention very recently in the field of protective devices for passengers in motor vehicles. Heretofore, the development of suitable propellant compositions to generate these nontoxic gases has encountered great difficulties. The propellant gases should contain components of a toxic nature only in legally permissible amounts, which means that they should be virtually nontoxic. Propellant compositions containing carbon will generate as toxic gases, primarily carbon monoxide and nitrous gases as well as hydrocyanic acid, dicyanogen, ammonia or phosgene. The propellant gases generated by inorganic propellant compositions contain primarily toxic particles in suspension. Generally the primary ingredient for generating propellant gases in inorganic fuel compositions is metal azides.

U.S. Pat. No. 2,981,616 describes a propellant system for generating propellant gas from metal azides and oxidants such as nitrates or perchlorates with the objective of using the resultant propellant gas to move liquid fuels in rockets. Even though this fuel system is described as being "inert", this description relates to its lack of reactivity with respect to the liquid fuels such as $N_2O_4$ and its neglible corrosive effect upon the equipment. Physiologically, the gases generated according to this patent are highly toxic, since they contain a substantial amount of NO. It is for this reason that this fuel composition cannot be utilized for the purposes of the present invention.

The German Offenlegungschrift No. 2,153,601 describes a sodium azide-potassium perchlorate system for generating nitrogen as an air cushion inflator. Highly toxic sodium oxide is present in the propellant gas in a very finely divided form and in great quantity. The removal of this sodium oxide takes place in a succeeding, or "secondary chamber", filled with silica, for example. The removal of sodium oxide by this method is very inefficient because the sodium oxide cannot be removed adequately from the propellant gas in this manner. Moreover, the method requires complicated equipment.

OBJECTS OF THE INVENTION

It is an object of the present invention to provide a novel propellant composition free of carbon, containing metal azides and generating an absolutely nontoxic propellant gas consisting mainly of nitrogen in a simple manner such as by direct conversion, and which is sufficiently low in temperature.

It is another object of the present invention to provide a propellant composition for the generation of nontoxic propellant gases suitable for the inflation of air cushion protective devices for passengers in motor vehicles comprising mixtures of (a) at least one stable metal azide selected from the group consisting of alkali metal azides and alkaline earth metal azides, (b) at least one oxidant metal compound capable of absorbing electrons during reaction with said at least one metal azide, for example nitrates, perchlorates, chromates or peroxides, and (c) silicon dioxide, the total metal ion ratio relative to the metal oxides developed during the combustion assuring the formation of glasslike silicates having as low as possible a melting point or softening point.

These and other and further objects of the present invention will become apparent as the description thereof proceeds.

DESCRIPTION OF THE INVENTION

The present invention relates to a propellant composition for the generation of nontoxic propellant gases suited for the inflation of air cushions for passenger protection devices in motor vehicles. This propellant is free of carbon, contains metal azides, and generates an absolutely nontoxic propellant gas consisting mainly of nitrogen in a simple manner such as by direct conversion, with said propellant gas being sufficiently low in temperature.

The present invention is directed to a propellant composition for the generation of nontoxic propellant gases suitable for the inflation of air cushion protective devices for passengers in motor vehicles comprising mixtures of (a) at least one stable metal azide selected from the group consisting of alkali metal azides and alkaline earth metal azides, (b) at least one oxidant metal compound capable of absorbing electrons during reaction with said at least one metal azide preferably nitrates, perchlorates, chromates or peroxides, and (c) silicon dioxide, the total metal ion ratio relative to the metal oxides developed during the combustion assures the formation of glasslike silicates having a melting point or softening point as low as possible.

The present invention is further directed to a development in the process for generating a propellant gas for inflation of air cushions for protective devices for passengers in motor vehicles which comprises providing a mixture of components that liberate the propellant gas within said protective device and reacting said mixture to liberate said propellant gas for inflating said air cushion, wherein the improvement comprises utilizing a propellant composition to generate nontoxic propellant gases comprising mixtures of (a) at least one stable metal azide selected from the group consisting of alkali metal azides and alkaline earth metal azides, (b) at least one oxidant metal compound capable of absorbing electrons during reaction with said at least one metal azide and preferably nitrates, perchlorates, chromates or peroxides, and (c) silicon dioxide, the total metal ion ratio relative to the metal oxides developed during the combustion assures the formation of glasslike silicates having a melting point or softening point as low as possible.

The propellant consists of preferably compressed mixtures of stable metal azides, primarily of the alkali metal and the alkaline earth metal groups of the Periodic Chart, oxidants such as practically all stable anhydrous nitrates, perchlorates, chromates, peroxides, or generally speaking all metal containing compounds which absorb electrons during their reaction with metal azides, and silicon dioxide, whose total metal ion ratio relative to the metal oxides produced during combustion assures the formation of glasslike silicates with as low a melting or softening point as possible. For example, the conversion of sodium azide, potassium nitrate, and very finely divided silicon dioxide into an alkali metal silicate, with $N_2$ gas given off, takes place in accordance with the following equation:

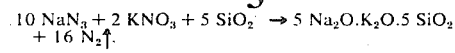
$10 NaN_3 + 2 KNO_3 + 5 SiO_2 \rightarrow 5 Na_2O.K_2O.5 SiO_2 + 16 N_2\uparrow$.

The formation of the glasslike melts during the combustion of the propellant is necessary in order to prevent the suspended particles from atomizing.

In another embodiment of the invention, the propellant composition additionally contains glass flux promoting metal oxides, such as lead oxide, ferric oxide and/or fluxes generally used in the glass industry. Various combinations of metal oxide-$SiO_2$ can be obtained by the appropriate composition of metal azide, oxidant and glass flux promoting metal oxide.

In another advantageous embodiment of the invention, the silicon dioxide, as an acid oxygen binding component is entirely or partially replaced by other acid reacting metal oxide compounds such as boric oxide or alkali metal metaphosphates which form glasslike melts. Oxides of the transition metals may be present as such or by way of the following compounds: nitrates, perchlorates, phosphates, chromates.

The propellant composition is conventionally detonated, for example, by utilizing a conventional pyrotechnic ignitor such as an ignition pellet which is electrically ignited, and then propogated through an ignition train comprised by an ignition mixture of boron and potassium nitrate or by flash powder in the form of a compressed granulate or in the form of a fine-grained single base or double base or composite propellant. The manner of detonation is not limitative of the invention.

The following examples are merely illustrative of the present invention without being deemed limitative in any manner thereof.

amount, in actual practice, this stoichiometry need not be adhered to any may be deviated therefrom. Excess alkali metal resulting from excess of the azides and developed during the decomposition reacts with silicon dioxide, for instance; on the other hand, oxygen will be liberated from the oxidants if there is less than the stoichiometric amount of azide.

The above described components which are ground and pulverized as finely as possible and highly dispersed are then compressed to form the propellant. The compressed solid propellants thus obtained are very strong mechanically.

EXAMPLE XIII

In the process for utilizing the fuel compositions of Examples I to XII for generating a propellant gas for inflation of air cushions for protective devices for passengers in motor vehicles, a mixture of the components of each of the examples was tested by reacting mixture No. 1 from the foregoing table to liberate the nontoxic propellant gas.

The following analysis, obtained by gas chromatography, was typical of the composition of nontoxic propellant gases developed during the combustion of the propellant according to each of Examples I to XII:
$N_2$:99.2 percent by volume; $O_2$:0.7 percent by volume; $NO_x$: a maximum of 20 ppm; $CO_2$:0 percent by volume; $H_2O$:0 percent by volume.

Although the present invention has been disclosed in connection with a few preferred embodiments thereof, variations and modifications may be resorted to by those skilled in the art without departing from the principles of the new invention. All of these variations and

| Examples of Compositions in Mols | | | | | | | | | | | | |
|---|---|---|---|---|---|---|---|---|---|---|---|---|
| Reaction Component | I | II | III | IV | V | VI | VII | VIII | IX | X | XI | XII |
| $NaN_3$ | 10 | 5 | 5 | 10 | 10 | — | — | — | 8 | — | 4 | 4 |
| $KN_3$ | — | 5 | 5 | — | — | 10 | 10 | 10 | — | 8 | 4 | 4 |
| $Ca(N_3)_2$ | — | — | — | — | — | — | — | — | 1 | 1 | — | — |
| $NaNO_3$ | — | — | 2 | — | — | 2 | — | — | — | 2 | — | — |
| $KNO_3$ | 2 | 2 | — | — | — | — | — | — | 2 | — | — | — |
| $Mg(NO_3)_2$ | — | — | — | — | 1 | — | 1 | — | — | — | — | — |
| $Ca(NO_3)_2$ | — | — | — | 1 | — | — | — | 1 | — | — | — | — |
| $NaClO_4$ | — | — | — | — | — | — | — | — | — | — | 1 | — |
| $KClO_4$ | — | — | — | — | — | — | — | — | — | — | — | 1 |
| $SiO_2$ | 4–6 | 4–6 | 4–6 | 5 | 5 | 5 | 5 | 5 | 5 | 5 | 3–6 | 3–6 |

Glass flux promoting oxides such as lead oxide or ferric oxide may be added to the ingredients in these examples; however, their quantity must not be large enough to considerably reduce the gas yield per gram of propellant.

At the same time, or independent thereof, the metal oxide binding ingredient, i.e. silicon dioxide, may be entirely or partially replaced by other compounds, such as boric oxide or metaphosphates, acid reacting with metal oxides.

Substances such as sulfides may be employed also, for example molybdenum sulfide, $MoS_2$. In the reaction with sodium azide, for example, sodium sulfide or sodium polysulfide is formed which dissolves in the metal oxide or acid reacting ingredients additionally contained in the glass melt or created during the combustion.

While the mol ratio of azides to oxidants in the above examples is essentially the stoichiometrically required modifications are considered to be within the true spirit and scope of the present invention as disclosed in the foregoing description and defined by the appended claims.

We claim:

1. A propellant composition for the generation of non-toxic propellant gases suitable for the inflation of air cushion protective devices for passengers in motor vehicles comprising mixtures of (a) at least one stable metal azide selected from the group consisting of alkali metal azides and alkaline earth metal azides, (b) at least one oxidant metal compound capable of absorbing electrons during reaction with said at least one metal azide, and (c) silicon dioxide, the total metal ion ratio relative to the metal oxides developed during the combustion assuring the formation of glasslike silicates having as low as possible a melting point or softening point, the ratio of $a:b:c$ being from 5:1:2 to 10:1:5.

2. The composition of claim 1, in which the mol ratio of said azide of (a) to said oxidant of (b) to said silicon dioxide of (c) is essentially stoichiometric.

3. The composition of claim 1, in which the metal of said oxidant compound is selected from the group consisting of alkali metals and alkaline earth metals.

4. The composition of claim 1, which further comprises glass flux promoting metal oxides.

5. The composition of claim 1, in which the silicon dioxide of (c) is at least partially replaced by at least one other acid reacting metal oxide compound which forms glasslike melts selected from the group consisting of boric oxide and alkali metal metaphosphates.

6. The composition of claim 1 wherein the oxidant is selected from the group consisting of chlorates, nitrates, chromates and peroxides.

* * * * *